July 10, 1934.  F. E. BRIGGS ET AL  1,966,000
SAFETY TRANSMISSION BRAKE
Filed Dec. 8, 1933  2 Sheets-Sheet 1
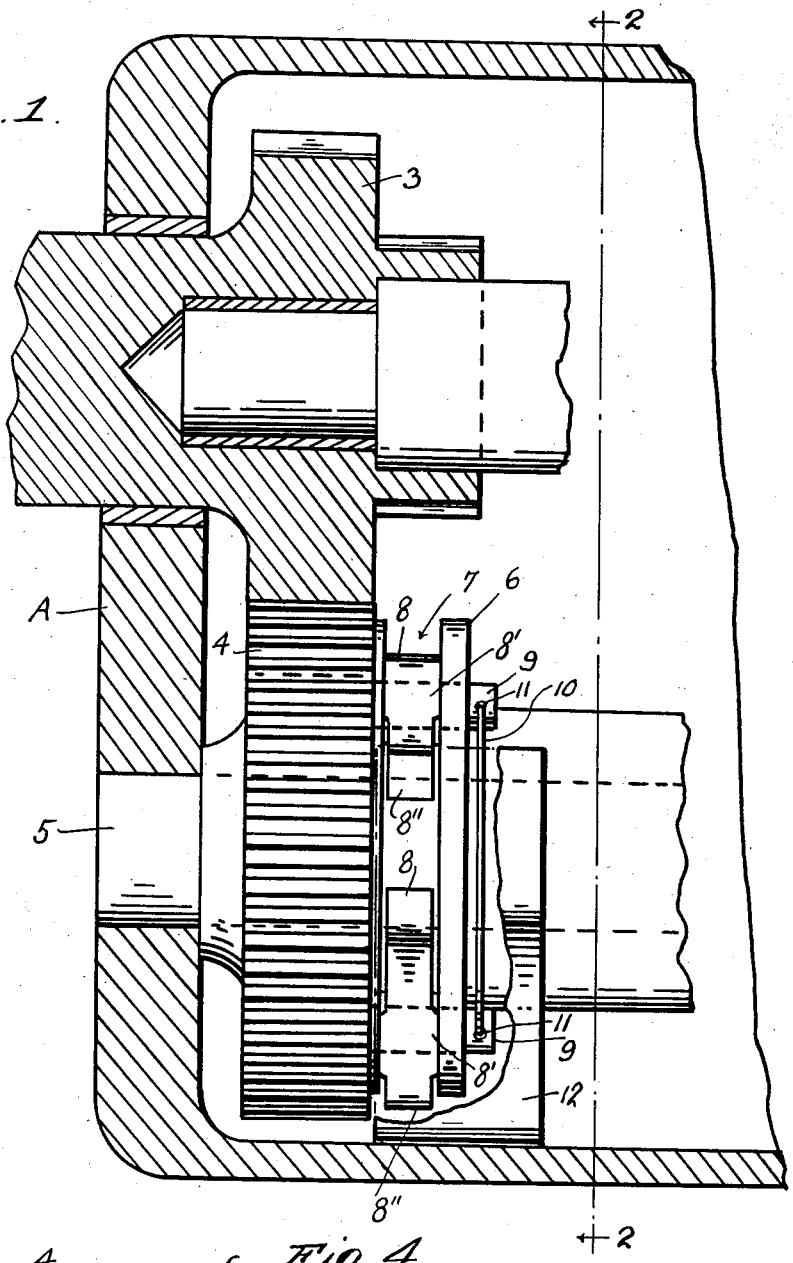
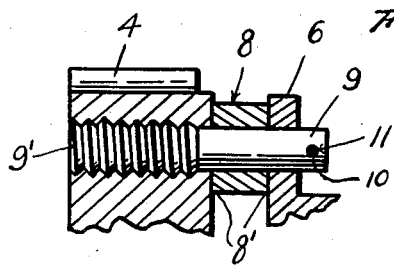
Inventors
*F. E. Briggs*
*E. M. Fuller*
By *Clarence A. O'Brien*
Attorney Inventors
F. E. Briggs
E. M. Fuller
By Clarence A. O'Brien
Attorney Patented July 10, 1934

1,966,000

UNITED STATES PATENT OFFICE 1,966,000

SAFETY TRANSMISSION BRAKE

Frank Earl Briggs and Edwin M. Fuller, Hoquiam, Wash.

Application December 8, 1933, Serial No. 701,512

2 Claims. (Cl. 188—30)

This invention relates to a safety transmission brake, the general object of the invention being to provide means for preventing a vehicle moving rearwardly down a grade or the like when the gears are being shifted into forward speed and preventing the vehicle moving forwardly down a grade or the like when the gears are in reverse.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a sectional detail view through portion of the transmission means of a motor vehicle, showing the invention in use.

Figure 4 is a section on line 4—4 of Figure 2.

Figure 2:
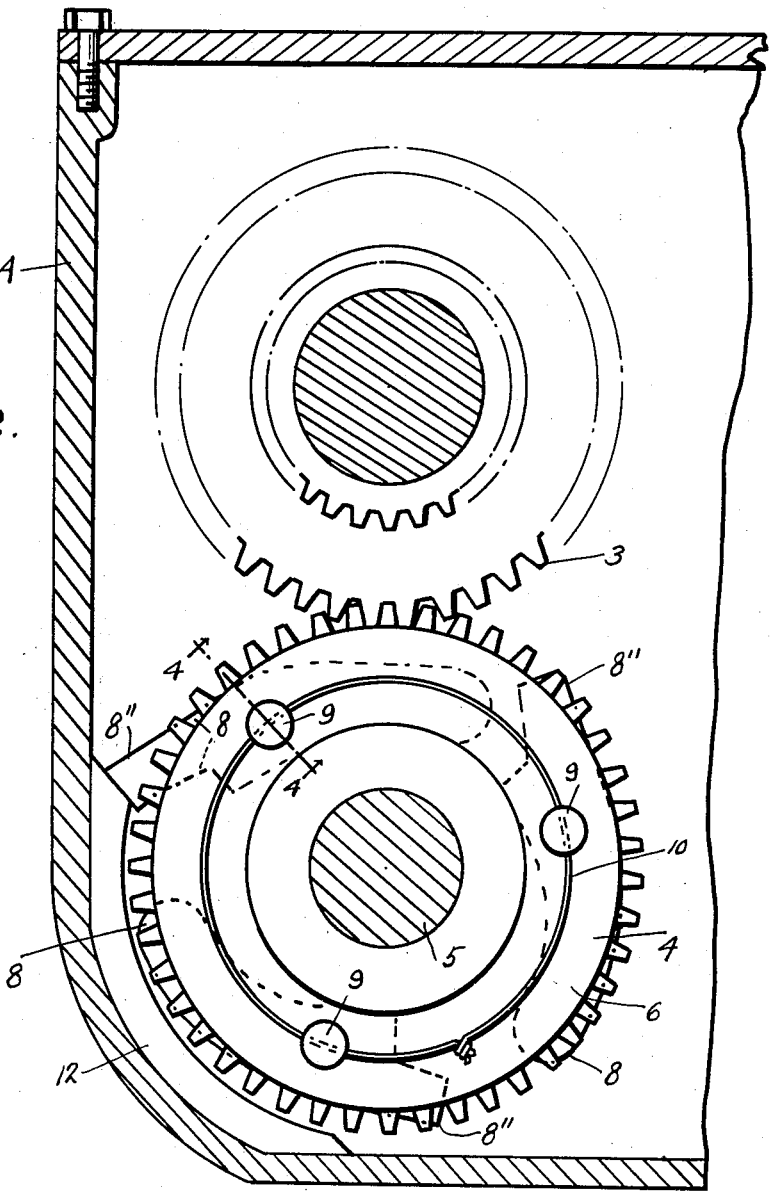
Figure 2 is a section on line 2—2 of Figure 1.

In these drawings, the letter A indicates a part of the transmission housing, the numeral 1 indicating a portion of the clutch shaft, and the numeral 3 indicates the gear carried by said shaft and which is in constant mesh with the gear 4 of the counter-shaft 5 of the transmission, this shaft, of course, carrying the secondary gears of the transmission means. In carrying out our invention, we make this gear 4 with an extension 6 which is provided with a groove 7. A plurality of dogs 8 are pivoted in this groove, the pivot pins being shown at 9, and these pins have threaded parts 9' which are threaded in holes formed in the gear 4, as shown in detail in Figure 4. After the parts are assembled, a wire 10 is threaded through holes 11 in the pins to hold the parts against accidental displacement.

Figure 3:
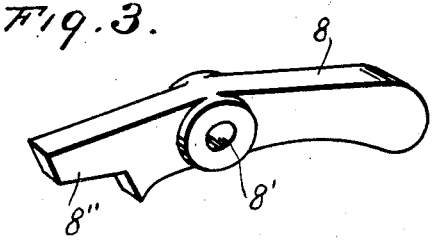
Figure 3 is a view of one of the dogs.

Each dog is preferably of the shape shown in Figure 3, with the pivot hole 8' formed in an intermediate portion thereof and with the toothed end 8" lighter and shorter than the other end so that this other end acts as a weight for moving the toothed end out of the groove when the dog is uppermost, as shown in Figure 2.

A substantially segmental-shaped member 12 is placed in or formed with a corner portion of the housing A, as shown in Figure 2, and the upper end of this member is beveled so as to be engaged by a toothed part 8" of a dog when said part is swung outwardly, as shown in Figure 2. When the gears are rotating, centrifugal force acts to cause the rear ends of the dogs to move outwardly so that the toothed portions move inwardly and thus the dogs cannot engage the member 12 when the gears are rotating.

Thus it will be seen that if the motor vehicle is in any forward gear, and the car or vehicle starts to roll backwardly, or if the vehicle is in reverse position and starts to roll forwardly, the forward end of the uppermost dog will engage the upper end of the member 12 and thus prevent further movement of the vehicle.

Thus we have provided a safety device which is of simple construction and which will prevent a car rolling down a grade or the like when shifting gears. It will be seen that the dogs are automatically released by centrifugal force when the gears start to rotate.

It is thought that the advantages of placing the device on a gear of the counter-shaft will be apparent, as the counter-shaft turns in one direction only, regardless of what gear the driver has selected and the only time that the counter-shaft does not turn in this one direction is when the car is in forward gear and the car starts to roll backwardly or when the car is in reverse gear and its starts to roll forwardly. Thus the invention will operate regardless of what gears of the transmission are in mesh.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. In a transmission mechanism including a counter-shaft and a gear connected therewith, a dog pivotally connected to said gear and having its rear end heavier than its front, operative end and a stationary projection engaged by said operative end of the dog when the same is moved outwardly by the heavy rear end thereof, said operative end being moved inwardly when the heavy end is moved outwardly by centrifugal force.

2. In a transmission of the class described including a housing, a clutch shaft, a counter-shaft and intermeshing gears on said shafts, the gear of the counter-shaft having an extension thereon formed with an annular groove, a number of dogs pivotally supported in said groove and each having a tooth at one end and a weighted other end, said weighted end moving the toothed end outwardly beyond the groove when the dog reaches an upper position, said weighted end moving outwardly by centrifugal force to move the toothed end into the groove when the gear is rotating, and a projection formed on the housing and engaged by the toothed end of the uppermost dog when said end is projecting from the groove.

FRANK EARL BRIGGS.
EDWIN M. FULLER.